US006721760B1

United States Patent
Ono et al.

(10) Patent No.: US 6,721,760 B1
(45) Date of Patent: Apr. 13, 2004

(54) METHOD AND APPARATUS FOR SEARCHING MULTI-DIMENSIONAL DATABASE AND STORAGE MEDIUM STORED SEARCH PROGRAM OF MULTI-DIMENSIONAL DATABASE

(75) Inventors: Akinori Ono, Yokohama (JP); Naoki Matsuo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 244 days.

(21) Appl. No.: 09/645,449

(22) Filed: Aug. 25, 2000

(30) Foreign Application Priority Data

Feb. 28, 2000 (JP) .......................... 2000-055971

(51) Int. Cl.[7] .............................................. G06F 17/30
(52) U.S. Cl. .................................................. 707/104.1
(58) Field of Search ................................ 707/3, 4, 100, 707/104.1

(56) References Cited

U.S. PATENT DOCUMENTS

| | | | | |
|---|---|---|---|---|
| 5,864,857 A | * | 1/1999 | Ohata et al. ................. | 707/100 |
| 5,943,668 A | * | 8/1999 | Malloy et al. ................. | 707/3 |
| 5,978,796 A | * | 11/1999 | Malloy et al. ................. | 707/3 |
| 6,081,804 A | * | 6/2000 | Smith ........................... | 707/5 |
| 6,205,447 B1 | * | 3/2001 | Malloy ......................... | 707/102 |
| 6,233,573 B1 | * | 5/2001 | Bair et al. .................... | 707/3 |
| 6,366,922 B1 | * | 4/2002 | Althoff ......................... | 707/103 R |
| 6,408,292 B1 | * | 6/2002 | Bakalash et al. .............. | 707/2 |

FOREIGN PATENT DOCUMENTS

JP          9-311862       12/1997

* cited by examiner

Primary Examiner—Greta Robinson
(74) Attorney, Agent, or Firm—Mattingly, Stanger & Malur, P.C.

(57) ABSTRACT

A multi dimensional database information table, a member management table, and a dimension information management table that hold the information for correlating the data of a plurality of multi dimensional databases are produced when the multi dimensional database is produced. When a user requests the relational data of a certain data while the user is searching a certain multi dimensional database on an application, the dimension information table and the multi dimensional database information table receive an access, and the multi dimensional database name in which the relational data exists, the measure dimension name, and the measure member are obtained and sent to the application as the relational data item of the data corresponding to the relational data request requested by the user.

13 Claims, 15 Drawing Sheets

301

| BRANCH CODE | BRANCH NAME |
|---|---|
| 0001 | YOKOHAMA BRANCH |
| 0002 | TOTSUKA BRANCH |
| ... | ... |

302

| BRANCH CODE | PRODUCT CODE | SALE | NUMBER OF SALE | DATE |
|---|---|---|---|---|
| 0001 | M10001 | 2000000 | 20 | 1999/1 |
| 0001 | M10002 | 5000000 | 100 | 1999/2 |
| ... | ... | ... | ... | ... |

303

| EMPLOYEE CODE | EMPLOYEE NAME | EMPLOYEE SALE | DATE |
|---|---|---|---|
| A00001 | EMPLOYEE A | 680000 | 1999/1 |
| A00002 | EMPLOYEE B | 78500 | 1999/1 |
| ... | ... | ... | ... |

304

| EMPLOYEE CODE | BRANCH MEMBER CODE |
|---|---|
| A00001 | 0001 |
| A00002 | 0002 |
| ... | ... |

305

| PRODUCT CODE | PRODUCT NAME |
|---|---|
| M10001 | REFRIGERATOR |
| M10002 | WASHING MACHINE |
| ... | ... |

| PRIMARY KEY | MEMBER 1 | MEMBER 2 |
|---|---|---|
| 0001 | YOKOHAMA BRANCH | YOKOHAMA |
| 0002 | TOTSUKA BRANCH | TOTSUKA |
| ... | ... | ... |

402

| PRIMARY KEY | MEMBER 1 |
|---|---|
| M00001 | REFRIGERATOR |
| M00002 | WASHING MACHINE |
| ... | ... |

403

| PRIMARY KEY | MEMBER 1 | MEMBER 2 |
|---|---|---|
| 1999/1 | 99'1 | 99'1 |
| 1999/2 | 99'2 | 99'2 |
| ... | ... | ... |

404

| PRIMARY KEY | MEMBER 1 |
|---|---|
| E10001 | EMPLOYEE A |
| E10002 | EMPLOYEE B |
| ... | ... |

FIG. 5

| MULTI DIMENSIONAL DATABASE NAME | DIMENSION NAME | MEMBER MANAGEMENT TABLE | MEMBER MANAGEMENT TABLE COLUMN NUMBER |
|---|---|---|---|
| M1 | CLASSIFIED BRANCH | BRANCH CODE | 1 |
| M1 | CLASSIFIED PRODUCT | PRODUCT CODE | 1 |
| M1 | CLASSIFIED DATE | DATE CODE | 1 |
| M2 | CLASSIFIED BRANCH | BRANCH CODE | 2 |
| M2 | CLASSIFIED EMPLOYEE | EMPLOYEE CODE | 1 |
| M2 | CLASSIFIED DATE | DATE CODE | 2 |
| ... | ... | ... | ... |

| MULTI DIMENSIONAL DATABASE NAME | MEASURE DIMENSION NAME | MEASURE MEMBER |
|---|---|---|
| M1 | SALES TOTAL | SALE |
| M1 | SALES TOTAL | NUMBER OF SALES |
| M2 | CLASSIFIED EMPLOYEE TOTAL | SALE |
| ... | ... | ... |

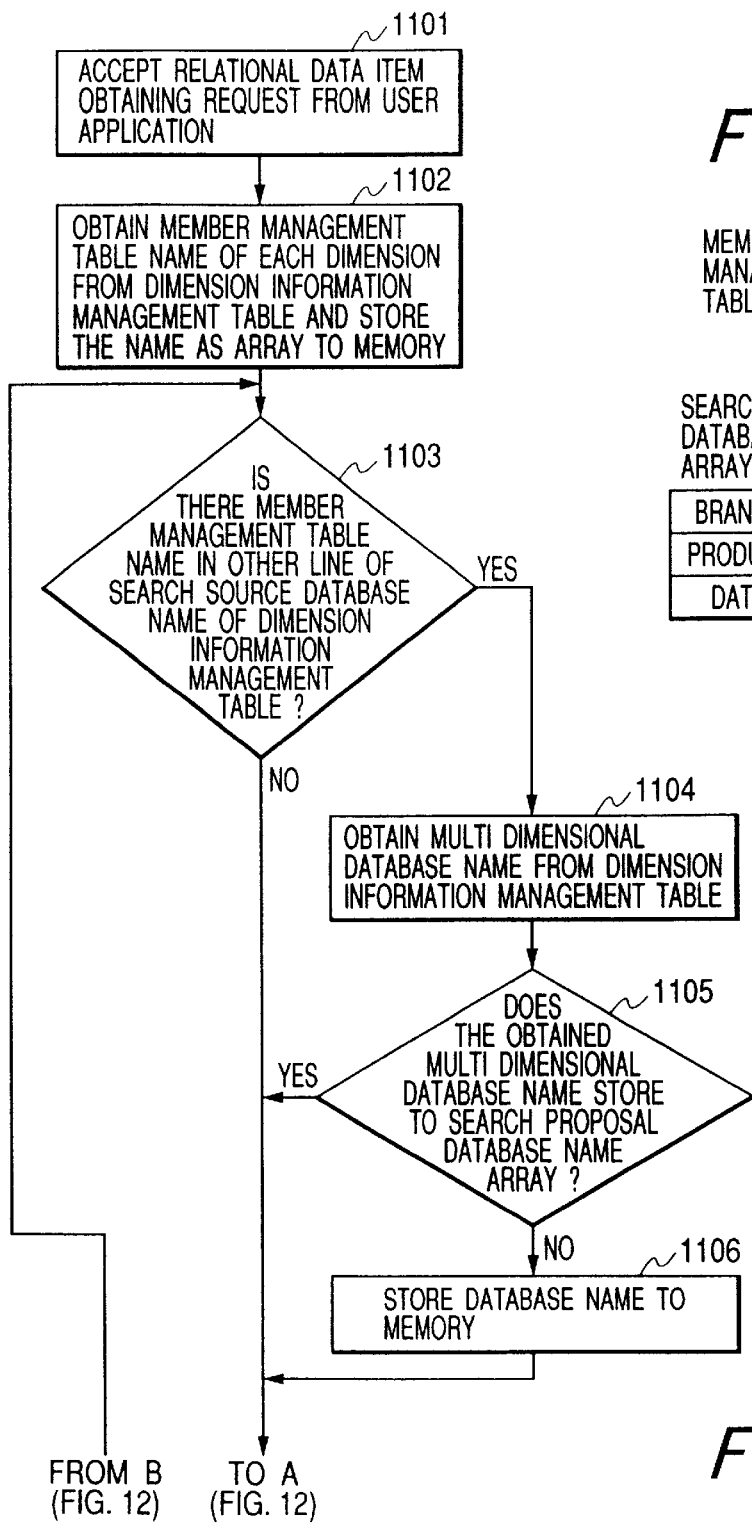
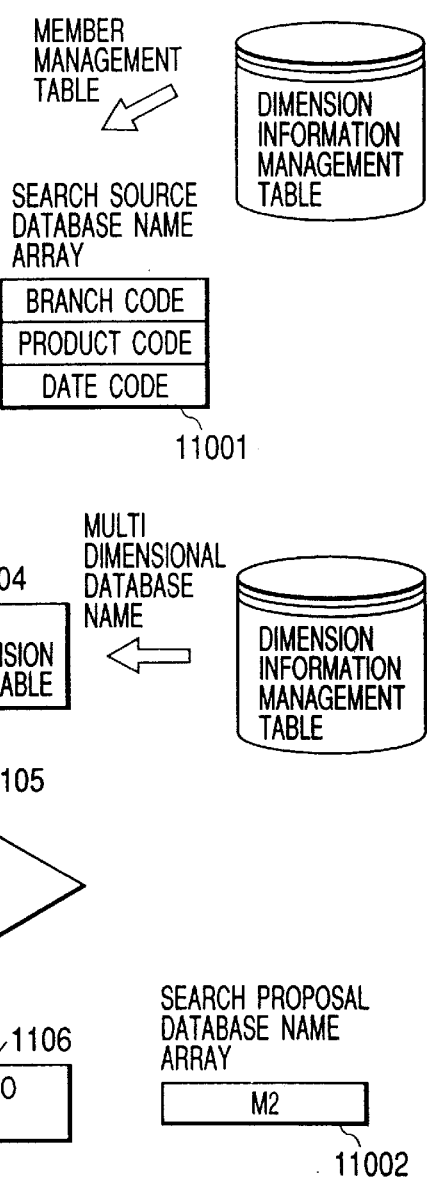

| SLIP CODE | CUSTOMER CODE | SALES |
|---|---|---|
| V00001 | C1002 | 25000 |
| V00002 | C1001 | 80000 |
| ... | ... | ... |

1502

| CUSTOMER CODE | CUSTOMER AGE | CUSTOMER ADDRESS |
|---|---|---|
| C1001 | 29 | YOKOHAMA-CITY TOTSUKA-KU |
| C1002 | 23 | YOKOHAMA-CITY MIDORI-KU |
| ... | ... | ... |

1503

| PRIMARY KEY | MEMBER 1 | MEMBER 2 |
|---|---|---|
| M00001 | REFRIGERATOR | REFRIGERATOR |
| M00002 | WASHING MACHINE | WASHING MACHINE |
| ... | ... | ... |

1504

| PRIMARY KEY | MEMBER 1 |
|---|---|
| YOKOHAMA-CITY TOTSUKA-KU | YOKOHAMA-CITY TOTSUKA-KU |
| YOKOHAMA-CITY MIDORI-KU | YOKOHAMA-CITY MIDORI-KU |
| ... | ... |

1505

| PRIMARY KEY | MEMBER 1 |
|---|---|
| 20—24 | 20—24 AGE |
| 25—29 | 25—29 AGE |
| ... | ... |

1506

| MULTI DIMENSIONAL DATABASE NAME | DIMENSION NAME | MEMBER MANAGEMENT TABLE NAME | MEMBER MANAGEMENT TABLE COLUMN NUMBER |
|---|---|---|---|
| M1 | CLASSIFIED BRANCH | BRANCH CODE | 1 |
| M1 | CLASSIFIED PRODUCT | PRODUCT CODE | 1 |
| M1 | CLASSIFIED DATE | DATE CODE | 1 |
| M2 | CLASSIFIED BRANCH | BRANCH CODE | 2 |
| M2 | CLASSIFIED EMPLOYEE | EMPLOYEE CODE | 1 |
| M2 | CLASSIFIED DATE | DATE CODE | 2 |
| M3 | CLASSIFIED PRODUCT | PRODUCT CODE | 2 |
| M3 | CLASSIFIED AREA | AREA CODE | 1 |
| M3 | CLASSIFIED AGE | AGE CODE | 1 |
| ... | ... | ... | ... |

1507

| MULTI DIMENSIONAL DATABASE NAME | MEASURE DIMENSION NAME | MEASURE MEMBER |
|---|---|---|
| M1 | SALES TOTAL | SALE |
| M1 | SALES TOTAL | NUMBER OF SALES |
| M2 | CLASSIFIED EMPLOYEE TOTAL | SALE |
| M3 | CLASSIFIED CUSTOMER TOTAL | SALE |
| ... | ... | ... |

FIG. 16

| REFRIGERATOR | NUMBER OF SALE | | | | |
|---|---|---|---|---|---|
| | 99'01 | 99'02 | 99'03 | 99'04 | 99'05 |
| YOKOHAMA BRANCH | 250 | 160 | 15 | 50 | 90 |
| TOTSUKA BRANCH | 150 | DRILL UP DRILL DOWN RELATIONAL DATA SEARCH | 45 | 35 | 80 |
| ... | ... | | ... | ... | ... |

FIG. 17

THE FOLLOWING RELATIONAL DATA IS DETECTED. DO YOU START SEARCH?

| MULTI DIMENSIONAL DATABASE | MEASURE DIMENSION NAME | MEASURE MEMBER | SEARCH |
|---|---|---|---|
| M2 | EMPLOYEE TOTAL | SALE | YES / NO |
| M3 | CUSTOMER TOTAL | SALE PRICE | YES / NO |

FIG. 18

| TOTSUKA | SALE | | | | |
|---|---|---|---|---|---|
| | A0002 | A00006 | ... | | |
| 99'01 | 78500 | 150000 | ... | | |

METHOD AND APPARATUS FOR SEARCHING MULTI-DIMENSIONAL DATABASE AND STORAGE MEDIUM STORED SEARCH PROGRAM OF MULTI-DIMENSIONAL DATABASE

BACKGROUND OF THE INVENTION

1. Field of the Invention

The present invention relates to a data searching method that uses a multi dimensional database management system.

2. Description of the Related Art

It is possible to access one multi dimensional database and search the data that exists in the multi dimensional database on a conventional multi dimensional database management system. Furthermore, a multi dimensional database system has been known in which, when a user requests the detailed date that is relational to the data in the multi dimensional database, the multi dimensional database management system issues a SELECT sentence of SQL to directly obtain the detailed data from a relational data base (in the form of table), and provides it to the user. However, when the user wants to obtain the data that is relational to the data that is being searched on another multi dimensional database, it is required for the user to access the multi dimensional database that is to be searched newly by the user and to search in the database.

A method disclosed in Japanese Unexamined Patent Publication No. H9-311862 has been known as a method having some flexibility in drill-down direction in data searching for searching the multi dimensional data by use of a plurality of databases. Since it is required to generate and issue an SQL sentence depending on the drill-down direction and to perform search and collection of a relational database listed in the form of table, table join process or the like is required, and the table join process is very heavy for the system.

Since the necessary dimension of the multi dimensional database is different depending on the user usually, not only one multi dimensional database is constructed for one system, but a plurality of multi dimensional databases are constructed.

The conventional art is specialized to obtain the data from the relational database as the detailed data during search of the multi dimensional database, and not specialized to a method for obtaining the relational data from a constructed another multi dimensional database. Therefore, when a user wants to have the information in another multi dimensional database, it is required for the user to access and search another multi dimensional database where the information is stored every time separately.

SUMMARY OF THE INVENTION

It is an object of the present invention to link between some loaded multi dimensional databases, and to provide a method for obtaining the relational data in another multi dimensional database from one multi dimensional database on the application. To achieve the above-mentioned object, in the present invention, respective members of multi dimensional databases capable of correlating is correlated each other, and the data in another multi dimensional database in which the member correlated to the data that is being searched exists can be obtained without issue of a new SQL sentence when the relational data in another multi dimensional database is requested.

In detail, in the method for correlating between respective members of multi dimensional databases each other, the information that is necessary to correlate between the respective members of each dimension of multi dimensional databases is taken out from the relational database in which the original data is stored, and the table for storing the data is produced.

In a case that the relational data in another multi dimensional database is to be obtained, by searching the produced table that stores the information for correlating between respective members in multi dimensional databases each other when the application requests the relational data corresponding to the data in the multi dimensional database, the relational data is searched in another multi dimensional database, which is a multi dimensional database different from the multi dimensional database that has requested the relational data, and the information that specifies the relational data is obtained to thereby obtain the relational data.

BRIEF DESCRIPTION OF THE DRAWINGS

FIG. 4 shows a member management table that is made when the multi dimensional databases M1 and M2 are loaded.

FIG. 5 is a dimension information management table that is made when the multi dimensional databases M1 and M2 are loaded.

FIG. 11 is comprised of FIG. 11(*a*), which is a flow chart for describing the relational data item process applied when the relational data item of the multi dimensional databases M1 and M2 is determined (No. 1), and FIGS. 11(*b*) and 11(*c*) which show arrays.

FIG. 15 is a table group used in an example when the multi dimensional database M3 is used.

FIG. 16 is an exemplary application on which the multi dimensional database M1 is being searched.

FIG. 17 is an exemplary application at the time when a relational data item has been obtained by searching the relational data during the searching of the multi dimensional database M1.

FIG. 18 is an exemplary application for showing the result of relational data searching during searching of the multi dimensional database M1.

DETAILED DESCRIPTION OF THE PREFERRED EMBODIMENTS

Figure 1:
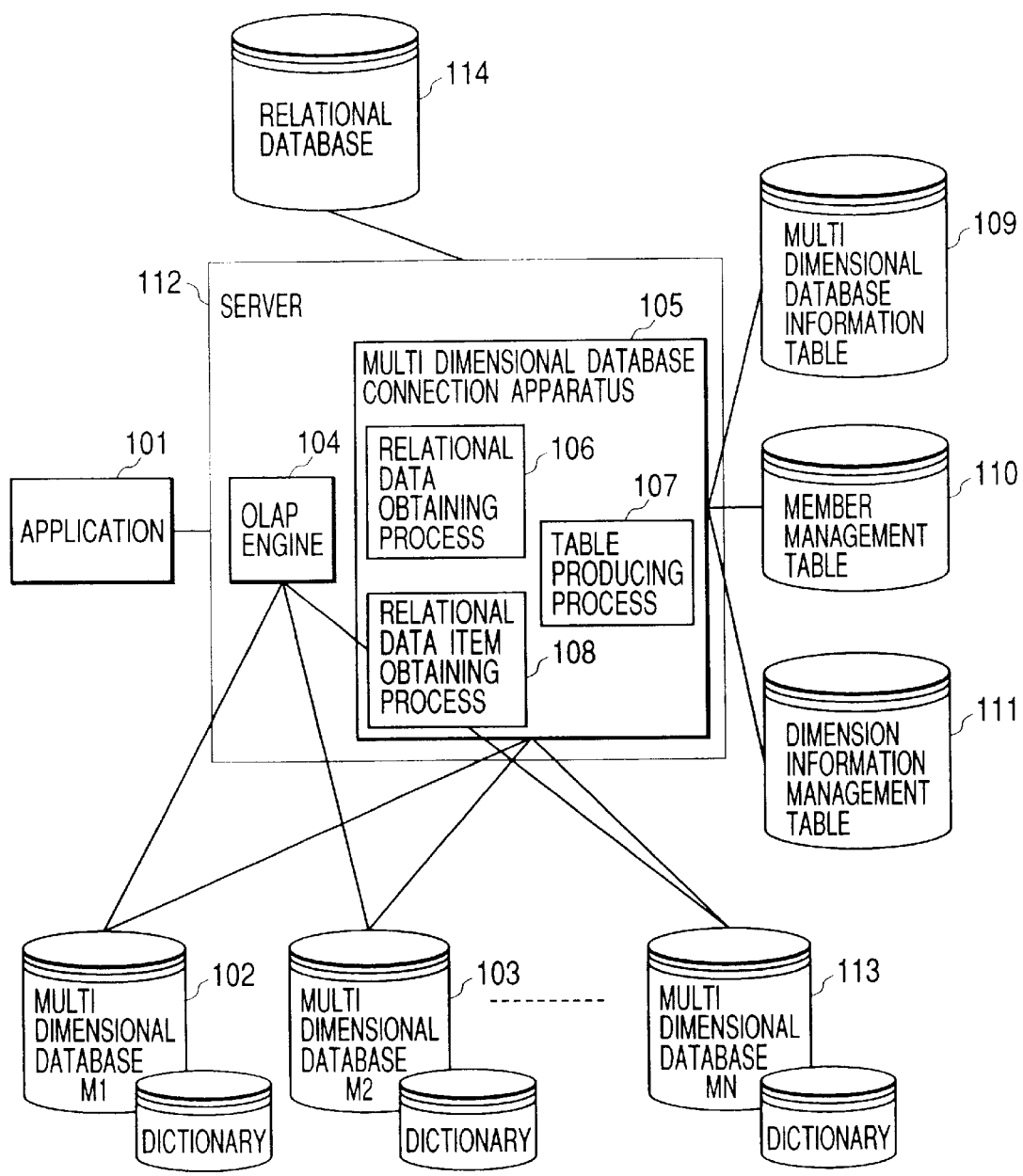
FIG. 1 is a diagram for illustrating an embodiment of a multi dimensional database system according to the present invention.

FIG. 1 is a diagram for illustrating an embodiment of a database management system to which the present invention is applied. A numeral 101 denotes an application program used when a user searches the data on the multi dimensional database. A numeral 112 denotes a server machine, and which is provided with an OLAP (On Line Analytical Processing) engine 104 for loading the table-style data from the relational database to the multi dimensional database for producing the multi dimensional database and for searching a certain data in the multi dimensional database when it is requested, which is the usual data searching request, and provided with a multi dimensional database connection apparatus 105.

The server machine 112 is connected to the relational database 114, and a multi dimensional database (102, 103, . . . 113) is constructed by using the information stored in the relational database 114. The multi dimensional database connection apparatus 105 comprises a table producing process program 107 that will be described hereinafter, a relational data item obtaining process program 108, a relational data obtaining process program 106. These programs are stored in a computer-readable recording medium. Furthermore, the server machine 112 is connected to the relational database that stores a multi dimensional database information table 109, a member management table 110, and a dimension information management table 111. These three tables are stored in the relational database in the present example, but these tables may be managed by the multi dimensional database management apparatus (through not shown in the drawing, it functions to manage the access to the multi dimensional database).

Figure 2A:
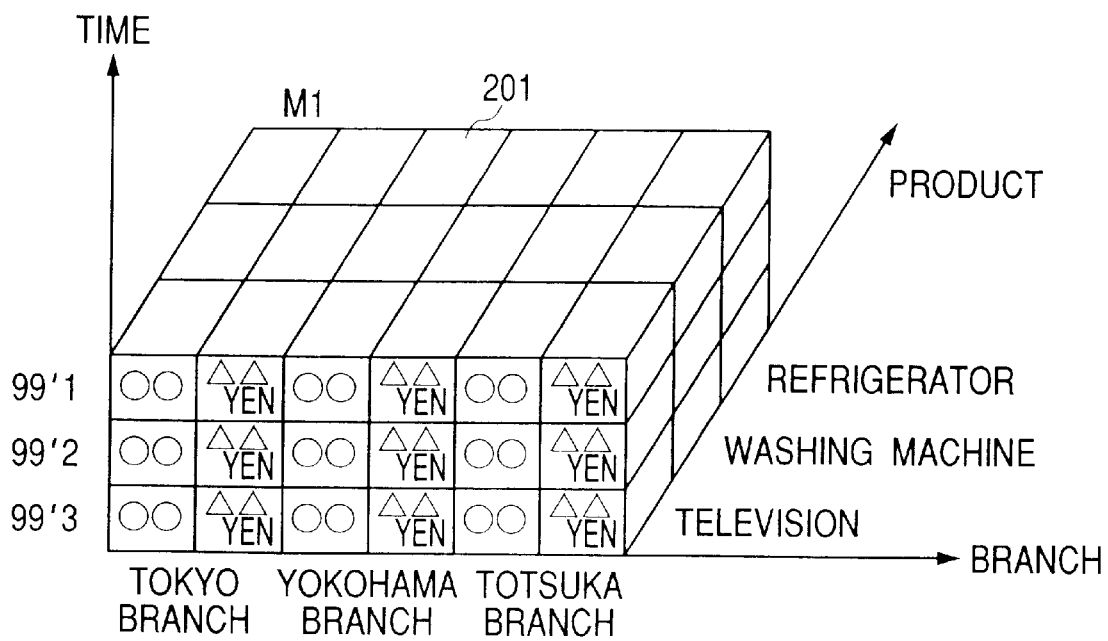
FIG. 2A and FIG. 2B show multi dimensional databases M1 and M2 according to the present invention.
Figure 2B:
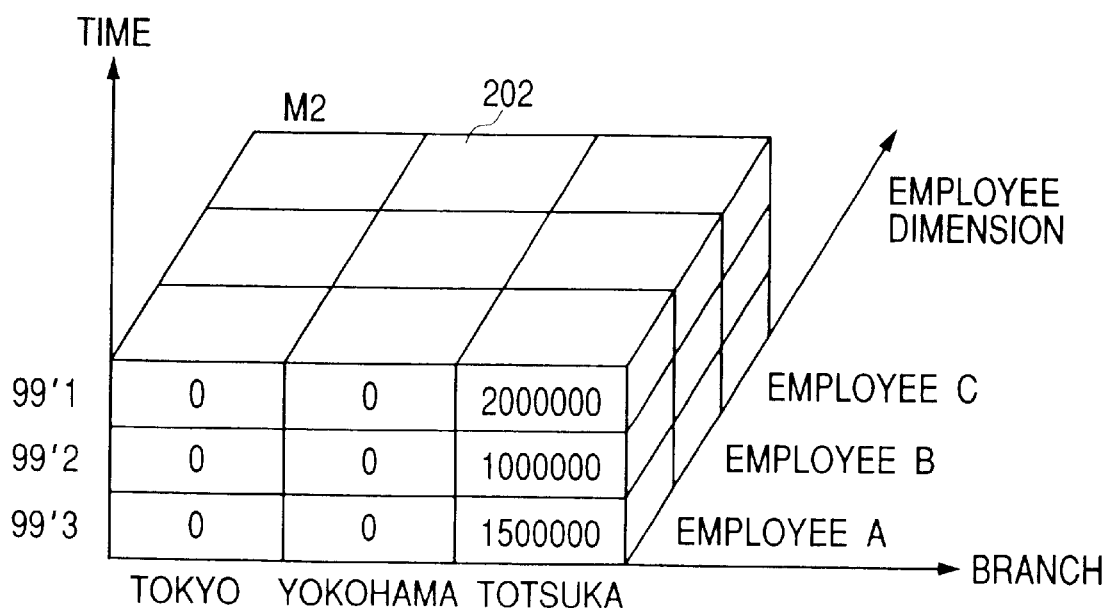

Herein, an exemplary multi dimensional database is shown in FIGS. 2(a) and 2(b). A multi dimensional database is suitable for the case in which the past data is collected and the trend of areas is found. Therefore, the data to be processed has several dimensions such as the sale area and product type, and each dimension is divided into sub dimensions to form a hierarchy structure. The multi dimensional database has a function to view the data from various view points and to summarize the data at the requested level quickly. The multi dimensional database shown in FIG. 2A has a cubic data structure comprising three dimensions namely time, branch, and product. For example, "Tokyo branch", "Yokohama branch" or the like of the branch is called as member name. For example, the plane of "○○" "△△yen" is called as that measure dimension name is sales total, and "○○" that represents "number of sales" is called as measure member. When the number of sales of television is wanted for classified branch and classified month, "television" may be indicated in the access. The sale and the number of sales may be the measure member. Otherwise, any one of them, for example, only the sale, may be the measure member.

The multi dimensional database information table 109 comprises three columns namely multi dimensional database name, measure dimension name, and measure member, and stores data items of the respective multi dimensional databases. Herein, the measure dimension represents the dimension that will be the data to be analyzed as described hereinabove, and the measure member represents the type of the data to be analyzed. The member management table 110 comprises the searching primary key, the member name 1, member name 2, . . . , member name N that are columns for storing members used in the multi dimensional database correspondingly to the primary key as shown in FIG. 4, and stores the information for correlating between members of the respective multi dimensional databases. In this case, essentially the same members such as "Yokohama branch" and "Yokohama" are correlated. The dimension information management table 111 comprises four columns namely the multi dimensional database name, the dimension name, the member management table shown in FIG. 4, and the member management table column number as shown in an example of FIG. 5, and stores the information for correlating between dimensions of the respective multi dimensional databases. The data listed in tables shown in FIG. 4, FIG. 5, and FIG. 6 will be described with respect to an example in which two multi dimensional databases described hereinafter are used.

Each table producing process program, which is provided with a function to obtain the primary key of the member of the multi dimensional database and the original data of the member used in the multi dimensional database from the relational database when a user produces the multi dimensional database, stores the data in the multi dimensional database information table 109, member management table 110, and dimension information management table 111 to thereby produce tables.

When a user requests the relational data while the user are searching the multi dimensional database, the relational data item obtaining process program starts to process after the multi dimensional database connection apparatus accepts the relational data item obtaining request that is executed from the application.

The relational data item obtaining process program functions to obtain the multi dimensional database name, measure dimension name, and measure member, in which the data that relates to the data searched by the user is stored, from the information stored in the multi dimensional database information table 109 and the dimension information management table 111 and functions to send them to the application. When the user decides the target data from among the data obtained by means of the relational data item obtaining process, the relational data obtaining process program starts to process after the multi dimensional database connection apparatus accepts the relational data obtaining request executed from the application. The relational data obtaining process program functions to obtain the member name of the data selected by the user from a dictionary of the multi dimensional database in which the data is stored, and obtains the member that relates to the data being searched in the multi dimensional database being searched by use of the search source database name selected by the user, the member management table 110, and dimension information management table 111 on the obtained member. Herein, the dictionary of the multi dimensional database defines the structure of the multi dimensional database, that is, it defines what dimension, member, measure, and dimension are included, how many number of measure members are included, and what is the measure members. Furthermore, the relational data obtaining process program functions to execute slice process in the multi dimensional database being searched on the member, and sends the result to the application as the relational data. Herein, the slice means that the multi dimensional database is sectioned at the middle of the length without changing the analysis axis to be used for data summary and the section is displayed on the front. For example, in the case of the database shown in FIG. 2A, at first classified branch and classified month data on the television are obtained, and then the same data on the washing machine is displayed on the front. The flow of these three processes will be described hereinafter in the example in which two multi dimensional databases are used.

Next, the embodiment of the present invention in which two multi dimensional database M1 and M2 are used will be described herein under. The multi dimensional database M1 is shown in FIG. 2A and the multi dimensional database M2 is shown in FIG. 2B. The multi dimensional database M1 201 has the branch, product, and time. The measure dimension of this multi dimensional database is the "sales total", and the measure member comprises "sale" and "number of sales" for representing the sales result. The multi dimensional database M2 202 has the branch, employee, and time.

The measure dimension of this multi dimensional database comprises the "employee total" and the measure member comprises "sale", and stores the employee result data.

Figure 3:
FIG. 3 shows a table group in a relational database served as the original data of the multi dimensional databases M1 and M2 according to the present invention.

The multi dimensional database M1 is the multi dimensional database loaded from the branch table 301, product total table 302 for each branch, and product table 305 of the relational database shown in FIG. 3, and the multi dimensional database M2 is the multi dimensional database loaded from the branch table 301, sale table for each employee 303, and branch member table 304 of the relational database shown in FIG. 3. It is assumed that the data is loaded in the order from M1 to M2. Usually, the table on the relational database used when the multi dimensional database is constructed is decided by a user by way of the application. The correlative relation between members of each dimension and the data in the table is decided by a user by way of the application. The location information for indicating the correlation between each member and the table in the relational database is stored in the dictionary in the multi dimensional database.

Figure 9:
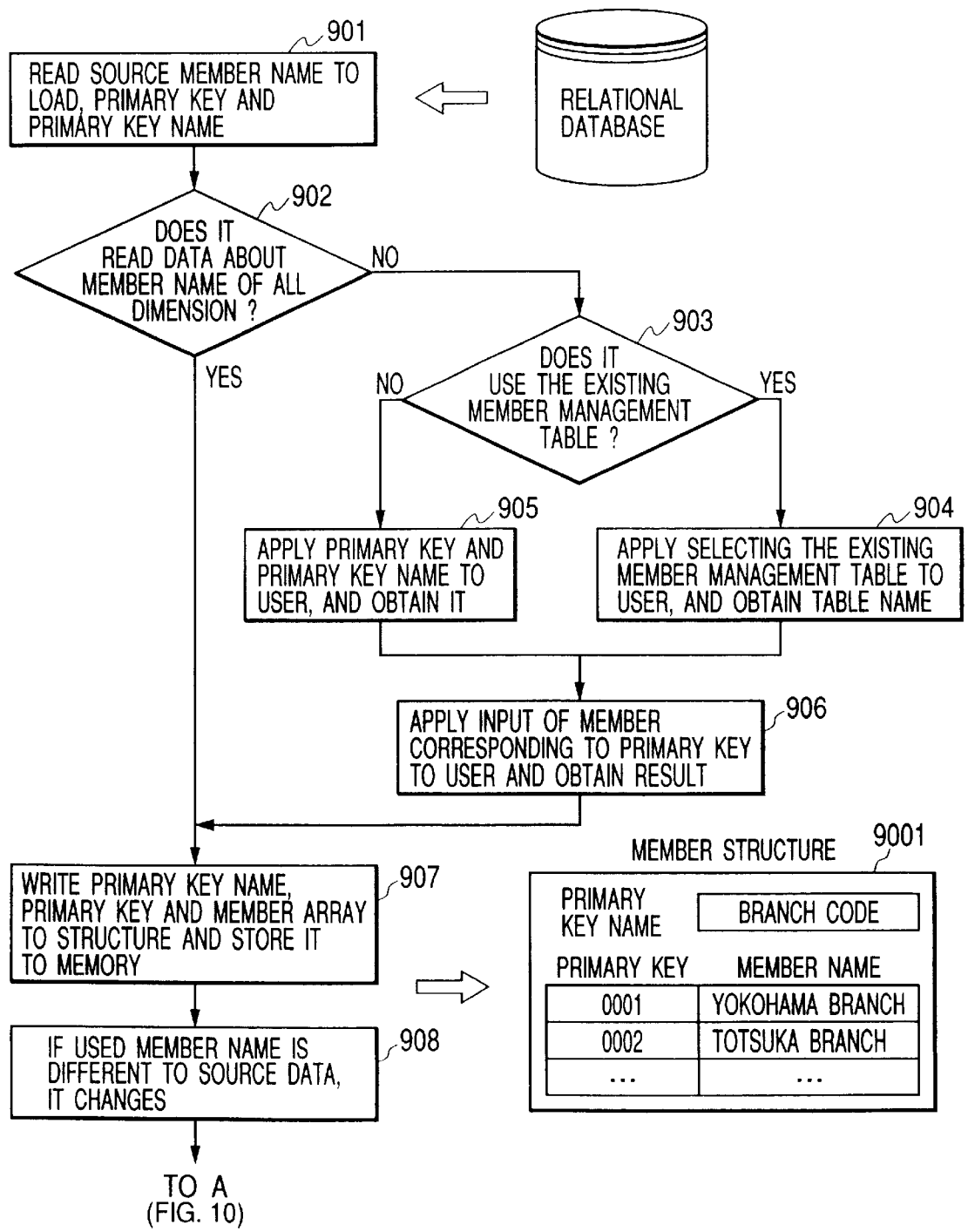
FIG. 9 is a flow chart for describing the table producing process applied when a table is produced for loading the multi dimensional databases M1 and M2 (No. 1).
Figure 10:
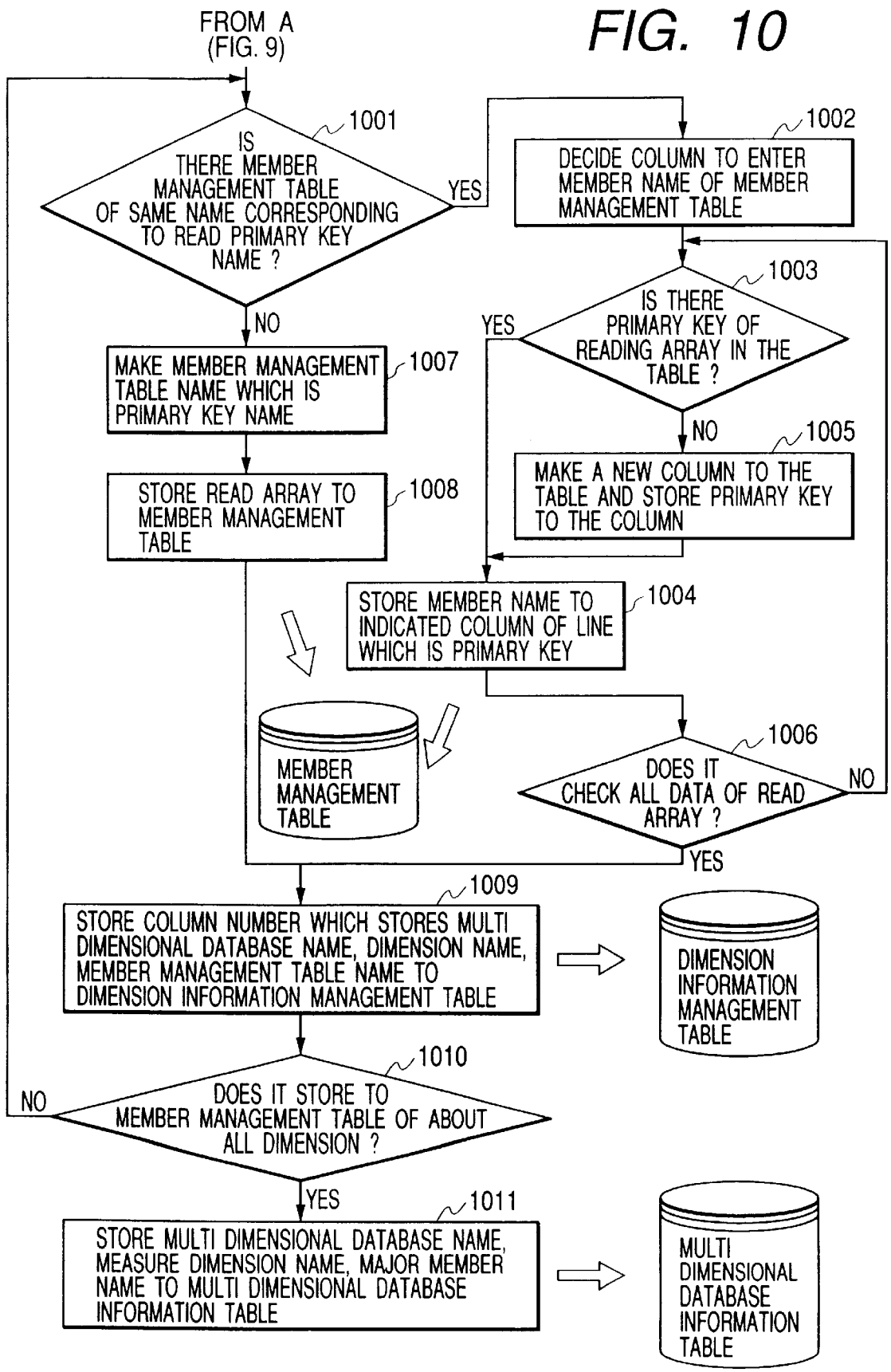
FIG. 10 is a flow chart for describing the table producing process applied when a table is produced for loading the multi dimensional databases M1 and M2 (No. 2).

The flow of producing process of the member management table, the dimension information management table, and the multi dimensional database information table executed when each table producing process program loads the data from the relational database is shown in FIG. 9 and FIG. 10. The data area in the temporary memory for storing the primary key name and the primary key, and the table-style data having the member as the column is referred to as the member structure (9001), and each table producing process program uses this member structure (9001) in the processing. The data to be stored in the member structure (9001) will be described hereinafter. Each table producing process program reads (901) the original data of the member of each dimension, the primary key thereof, and the primary key name to be loaded from the relational database at first. At that time, each table producing process confirms that the data has been read for members of the all the dimensions (902). The time member of the multi dimensional database M1 cannot be read from the relational database because there is no primary key, whether it is possible to produce from the existing member management table or not is determined. As the result if it is found that it appears in the system of the present example first time (903), then the user is applied for the primary key name and the primary key, and the user produces the primary key name and the primary key (905), and enters the corresponding member (906). If there is in the existing member management table, then the user is applied for the selection of the existing member management table, and the table name is obtained (904). Next, each table producing process program stores the read data and the input data supplied from the user in the member structure (9001) in the form of the table having the primary key name column, primary key column, and member column for each dimension and retains them in the memory (907). The member structure (9001) shows an example in which the primary key name that is the read data for the branch of the multi dimensional database M1 is "branch code" and the primary key and the member name are assigned to columns. It is assumed that the user decides to use the member name different from the original data for the member name of the branch of the multi dimensional database M2 by way of the application when the multi dimensional database M2 is constructed. In this case, each table producing process program changes it to the member name that is actually used by the user in the loading on the multi dimensional database M2 (908).

Next, each table producing process program confirms whether there is the member management table having the read primary key name (1001). In the present example, at first the multi dimensional database M1 is loaded and the member management table for the member name of each dimension is not made. Therefore, the member management table having the primary key name written in the member structure (9001) as the table name is made for the member of each dimension of M1, and the table style data having the primary key column and member column is stored in this table (1007, 1008). The member management table "branch code" 401 shown in FIG. 4 for the member name of the branch of M1, the member management table "product code" 402 for the member name of the product, and the member management table "date code" 403 for the member name of the time are made respectively by executing 1001, 1007, and 1008 processes of each table producing process for each dimension of the multi dimensional database M1. The member name management table is made similarly when the next multi dimensional database M2 is loaded. The branch of the multi dimensional database M1 and the branch of the multi dimensional database M2 are loaded from the relational database with the primary key of the same branch code. At that time, because there is the member management table having the same name corresponding to the read primary key name (1001), each table producing process program decides the column 2 located next to the column where the member is already stored as the column in which the member of the branch of M2 is registered because the multi dimensional database name is different at first (1002) and whether there is the primary key stored in the member structure (9001) in the member management table "branch code" 401 or not is searched (1003). If there is the primary key, then it is registered in the column 2 of the line (1004). On the other hand, if there is no primary key, a new line is produced, and the primary key and the member name are stored (1004, 1005). These processes (1003 to 1005) are executed for all the read members (1006). There is no primary key of the member name of the time in the multi dimensional database M2 as in the case of the time of the database M1, but, as in the case of M1, because it is the member for representing the date, the user uses the primary key of the member management table "date code" 403 (903, 904) to enters the member corresponding to the primary key (906), and the each table producing process program registers the input member in the column 2 of the member management table "date code" 403 through from step (1001) to step (1006). The member name of the employee of the multi dimensional database M2 is produced by tracing the member management table "employee code" 404 through from steps (1001), and (1007), to (1008). As described hereinabove, the member management table is made every time when each multi dimensional database is made. In the case that the member management table has been already made using the member name that uses the same primary key, a new column is made next to the column that has been made already in the table, and the member name of the dimension corresponding to the multi dimensional database that will be made newly is written in the new column.

After the member management table has been made, the each table producing process program stores the multi dimensional database name, the dimension name of the multi dimensional database used for making the member management table, the member management table name in which the member of the dimension is written, and the column number in which the member is stored in the dimension information management table (FIG. 5) (1009). After the member of all the dimensions has been stored in the member management table (1010), each table producing process program makes the multi dimensional database name, the measure dimension name, and measure member, and stores them in the multi dimensional database information table (1011).

It is assumed that the above-mentioned multi dimensional databases M1 and M2 have been made already and are ready for searching in the multi dimensional database system that is the embodiment of the present invention, and a user holds the access right to both multi dimensional databases M1 and M2. The data flow of the process for obtaining the obtainable relational data item that is executed by means of the relational data item obtaining process program at first that is operated when the user requests the relational data of a certain data while the user is searching the database M1 on the application is shown in FIG. 7, and the process flow is shown in FIG. 11 and FIG. 12.

Figures 6, 7:
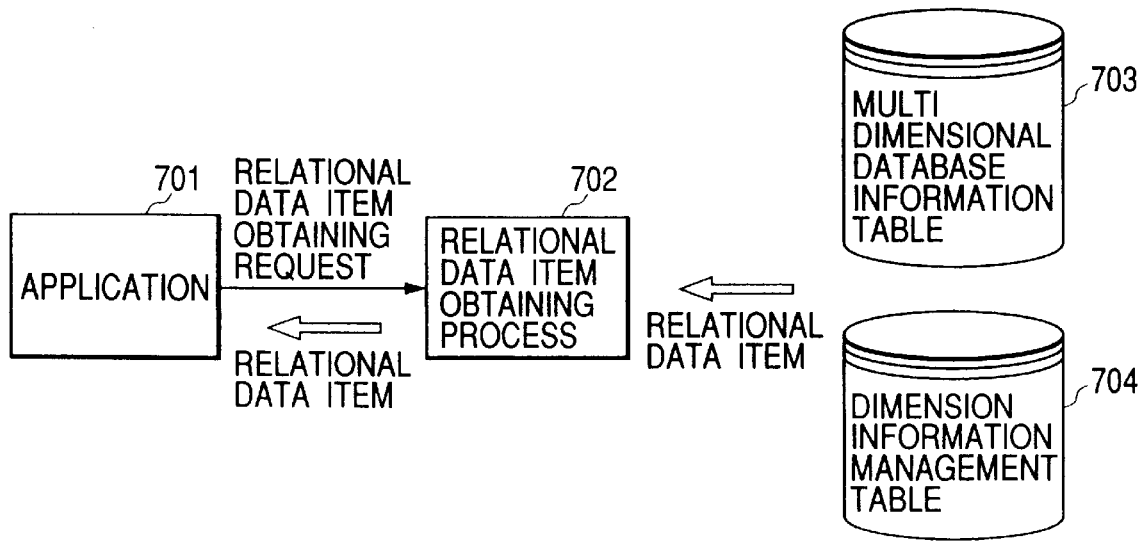
FIG. 6 is a multi dimensional database information table that is made when the multi dimensional databases M1 and M2 are loaded.
FIG. 7 is a diagram for illustrating a process block structure used when the relational data item of the multi dimensional databases M1 and M2.

In FIG. 7, it is assumed that a need to obtain a relational data from another multi dimensional database occurs while the application 701 is searching the multi dimensional database M1. At that time, the information of the multi dimensional database name that is searched by the user is sent from the application 701 to the relational data item obtaining process program 702, and the relational data item obtaining process 702 holds it in the memory. The dimension information management table 704 is searched, and the member management table name that is common to the member management table name of each dimension of the multi dimensional database M1 is searched. At that time, the multi dimensional database M2 having the member management table name of the same branch code is obtained. Furthermore, next the multi dimensional database information table 703 is searched, and as the result it is found that M2 has the related measure dimension name referred to as the employee total and the measure member referred to as the sale. This is returned to the application 701 as the relational data item. The application 701 displays the returned multi dimensional database name, the measure dimension name referred to as the employee total, and the measure member name referred to as the sale for applying to the user for an answer whether the searching is to be continued or not. The outline of the data flow of the process for obtaining the relational data item is described hereinabove.

Figure 12:
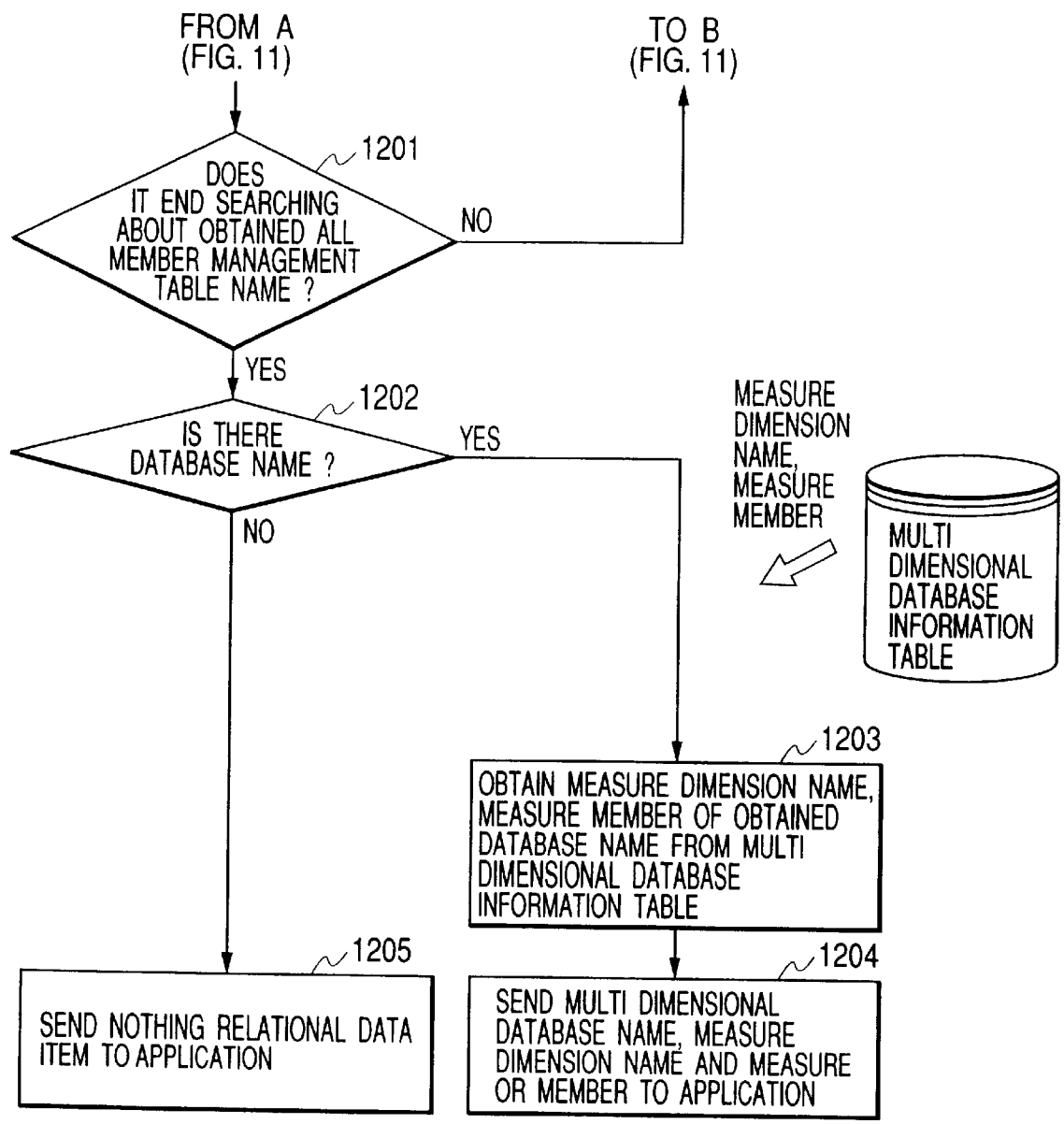
FIG. 12 is a flow chart for describing the relational data item process applied when the relational data item of the multi dimensional databases M1 and M2 is determined (No. 2).

Before detailed description of the relational data item obtaining process program shown in FIG. 11 and FIG. 12, an exemplary application that is used by a user when the relational data is requested is shown in FIG. 16. In the present example, it is assumed that a user who is searching the multi dimensional database M1 has an interest on the sale of the refrigerator by Totsuka branch in the date January 1999, and selects the relational data search on the screen shown in FIG. 16 to know another data. At that time, the application issues a relational data item obtaining request to the relational data item obtaining process. Herein, the data area in the temporary memory for holding each member management table name in the table style in which the member of each dimension of the search source multi dimensional database is stored is referred to as the search source member management table name array (11001), and the data area in temporary memory that holds the table-style multi dimensional database name in which the relational data is stored is referred to as the search source database name array (11002) and the relational data item obtaining process program uses these two arrays (11001, 11002) in the processing step. The data to be stored in the arrays (11001, 11002) will be described hereinafter. In FIG. 11, the relational data item obtaining process program accepts the request for obtaining the relational data item from the application, and then takes out the member management table name of each dimension of the multi dimensional database M1 from the dimension information management table and writes it on the search source member management table name array (11001), and stores it in the memory (1102). The search source member management table name array (11001) shows a storage example of the member management table name "branch code", "product code", and "date code" in which the member of each dimension of the search source multi dimensional database M1 is held. Next, whether there is any multi dimensional database name other than the search source multi dimensional database having the same member management table name as the obtained member management table name in the dimension information management table is searched (1103), and if it is found, then the multi dimensional database name is obtained (1104). Next, if the obtained multi dimensional database name is not the multi dimensional database name written already in the search source data base name array (11002) (1105) (1104), then the obtained multi dimensional database name is written in the search database name array (11002) (1106). In the present example, because the member management table name "branch code" obtained by the member management table name array (11001), the branch of the multi dimensional database M2, and the member management table name "data code" have the same member management table name as the time of the multi dimensional database M2, the relational data item obtaining process obtains the multi dimensional database name M2 (1103, 1104). The multi dimensional database name M2 is written in the search source database name array (11002) and stored in the memory (1105, 1106). After whether another multi dimensional database has the same member management table name or not is searched on the member management table name of the entire dimension of the multi dimensional database M1 (1201), the name "employee total" that is a measure dimension name of the obtained multi dimensional database name M2 and the measure member name "sale" are obtained from the multi dimensional database information table (1202, 1203), and they are sent to the application (1204). The application sends out the multi dimensional database name "M2", the measure dimension name "employee total", and the measure member "sale", and applies for whether the user will obtain the relational data.

An exemplary display style for displaying the data that the application received from the relational data item obtaining process program is shown in FIG. 17. As shown in FIG. 17, M2 is displayed as the multi dimensional database name, the employee total is displayed as the measure dimension name, and the sale is displayed as the measure member name. In addition, buttons for searching and for no searching are displayed, and if the searching button is selected, then the sequence for obtaining the sale proceeds continuously. The relational data item is exemplified over two lines for generalization in FIG. 17, however, in this case only one line is displayed. If another multi dimensional database name cannot be obtained as the result of searching of the dimension information management table, then the result that no relational data item is obtained is sent to the application (1205).

Figure 8:
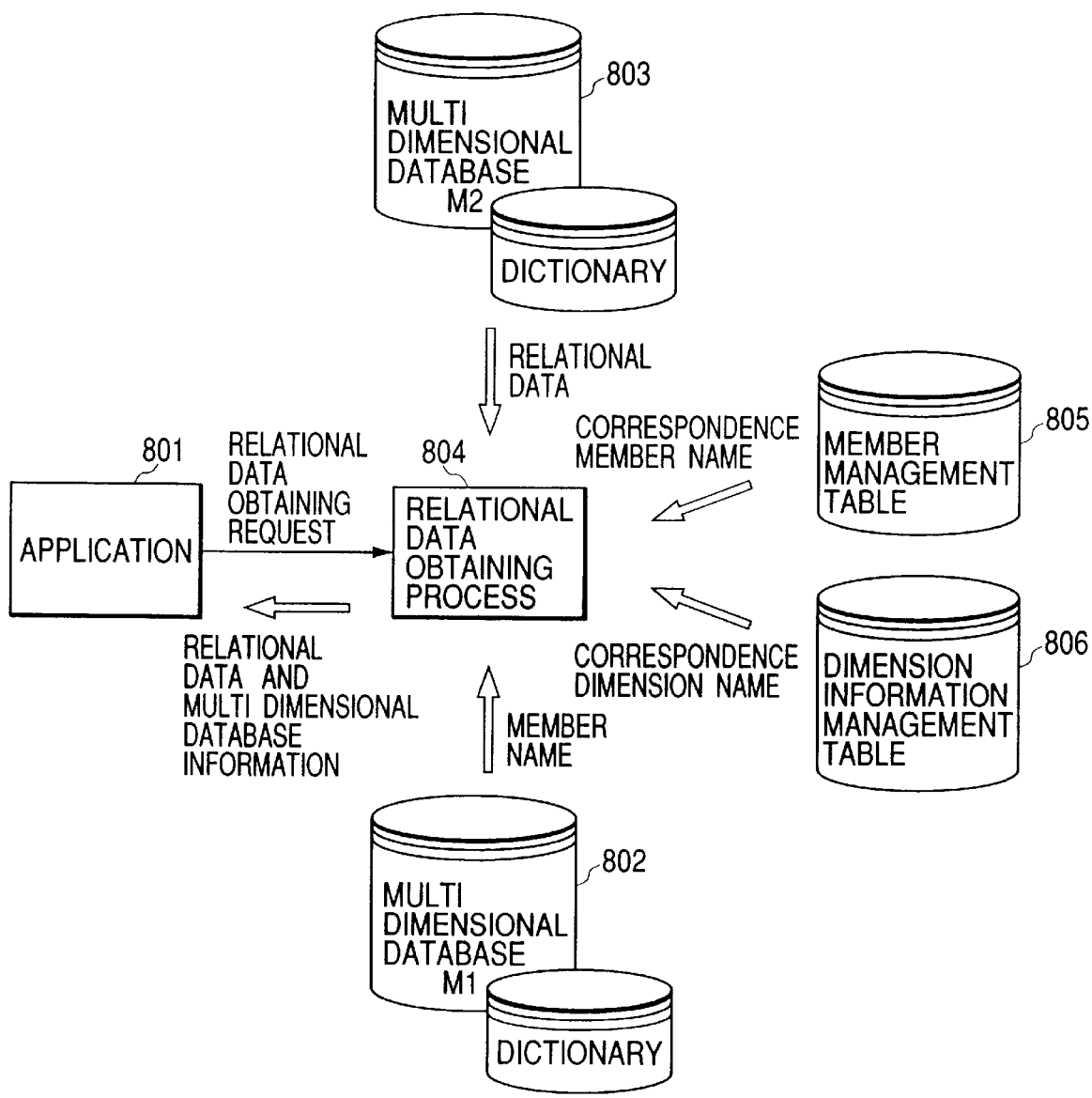
FIG. 8 is a diagram for illustrating a process block structure used when the relational data of the multi dimensional databases M1 and M2 is obtained.
Figure 13:
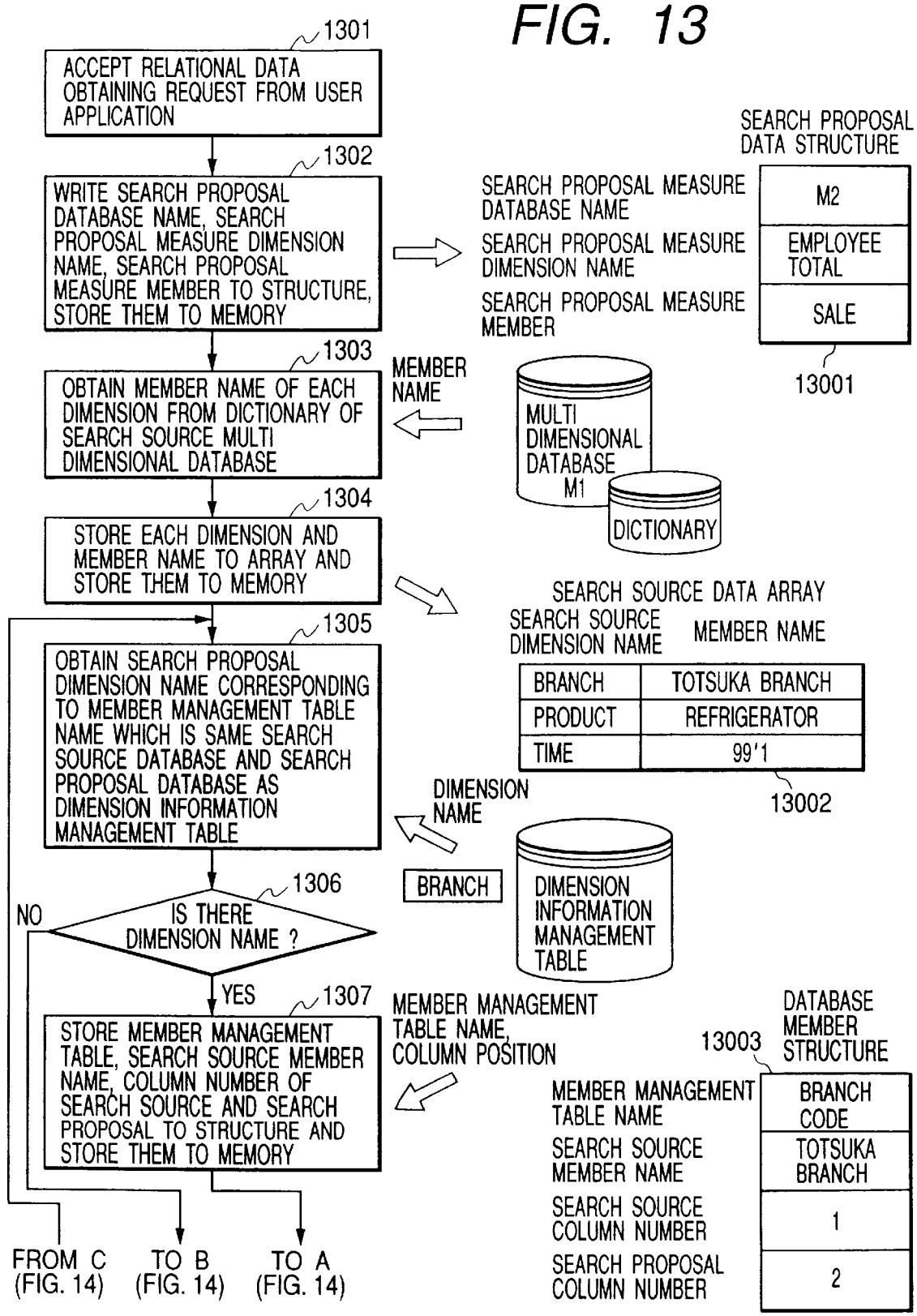
FIG. 13 is a flow chart for describing the relational data obtaining process applied when the relational data of the multi dimensional databases M1 and M2 is obtained (No. 1).
Figure 14:
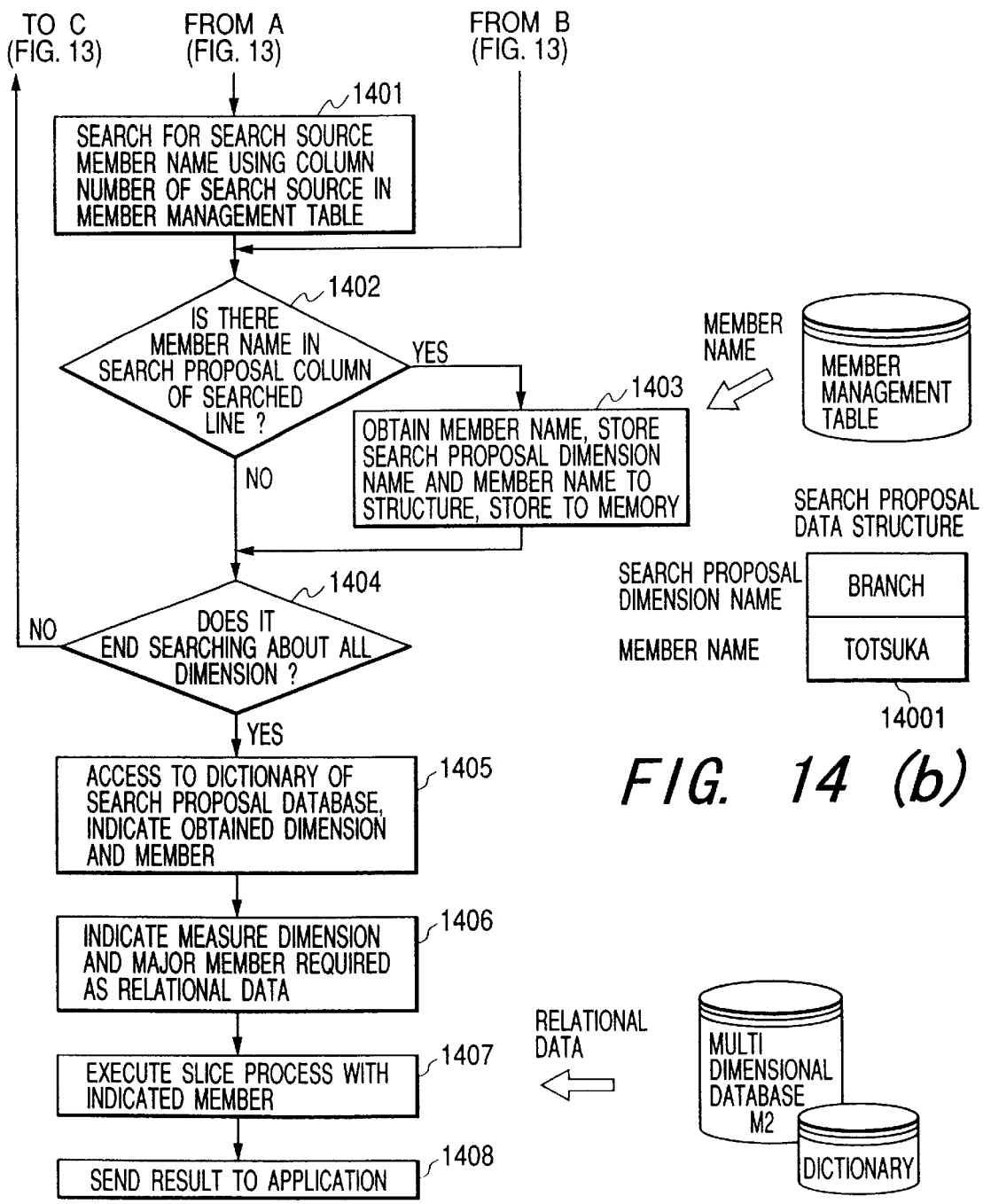
FIG. 14 is comprised of FIG. 14(*a*), which is a flow chart for describing the relational data obtaining process applied when the relational data of the multi dimensional databases M1 and M2 is obtained (No. 2), and FIG. 14(*b*), which is a data structure.

The data flow of the relational data obtaining process program that is implemented after the user requested for obtaining the relational data on the application is shown in FIG. 8, and the process flow is shown in FIG. 13 and FIG. 14. The outline of the data flow in the relational data obtaining process will be described with reference to FIG. 8. The user may select the relational data item to be searched by use of a mouse or the like on the screen as shown already in FIG. 17 as an exemplary method in which the user requests the relational data on the application.

When the user does selection, the relational data obtaining request is issued from the application 801 to the relational data obtaining process 804. It is assumed that the user has an interest on the measure dimension "employee total" and the measure member "sale" on the multi dimensional database M2, and selects and requests these data as the relational data. Then, the relational data obtaining process program 804 accesses the dictionary of the multi dimensional database M1 802, and obtains the member name of each dimension. In detail, Totsuka branch for the branch, the refrigerator for the product, and 99'1 for the time are obtained. Next, the corresponding branch having the same member management table name is obtained from the dimension information management table 806. Next, the branch code of the member management table 805 receives an access and the corresponding member name "Totsuka" is obtained thereby, and the data code receives an access and the corresponding member name "99'1" is obtained thereby. Next, the multi dimensional database M2 803 receives an access, the uppermost layer of "Totsuka" and "99'1" is indicated, and the measure dimension employee total and the measure member sale data is obtained. Thereafter, slicing process is applied and the result is sent to the application.

In FIG. 13, the data area in the temporary memory that stores the multi dimensional database name, the measure dimension name, and the measure member of the obtainer of the relational data selected by the user is referred to as the search source data structure (13001). The data area in the temporary memory that stores each dimension of the search source database and the member name of each dimension listed in the table style is referred to as the search source data array (13002). The data area in the temporary memory that stores the column number where the member of the search source database in the member management table exists and the column number where the member name of the search source database exists is referred to as the database member information structure (13003). The data area in the temporary memory that stores the dimension name and the member in the dimension of the search source database where the member corresponding to the member of the search source database exists is referred to as the search source member data structure (14001). The relational data obtaining process program uses these three structures (13001, 13003, 14001) and the array (13002) in the processing step. The detail of the data to be stored in the structures (13001, 13003, 14001) and the array (13002) will be described hereinafter. After the request for obtaining the relational data has been accepted (1301), the relational data obtaining process program writes the multi dimensional database name "M2", the measure dimension name "employee total", and the measure member "sale" of the obtainer of the relational data on the search source data structure (13001) and stores them in the memory (1302). The relational data obtaining process program accesses to the dictionary of the search source multi dimensional database M1 to thereby obtain the member name of each dimension from which the measure dimension is excepted, and writes it together with each dimension name on the search source data array (13002) and stores them in the memory (1303,1304). In this case, "Totsuka branch" for the branch, "refrigerator" for the product, and "99'1" for the time are obtained. The search source data array (13002) shows an exemplary storage of the obtained member. Then, the relational data obtaining process program obtains the branch of the multi dimensional database M2 having the same table name as the member management table of the branch of the multi dimensional database M1 from the dimension information management table (1305). Next, the column number "1" in the member management table "branch code" of the branch of the multi dimensional database M1 and the column number "2" of the branch of the multi dimensional database M2 are obtained from the dimension information management table. The member management table name "branch code", the member "Totsuka branch" in the branch of the multi dimensional database M1, the column number "1" of the multi dimensional database M1, and the column number "2" of the multi dimensional database M2 are written in the database member information structure (13003), and stored in the memory (1306, 1307). Next, the member management table "branch code" receives an access, the member name "Totsuka branch" is searched in the column 1 (1401), the member name that exists on the column 2 on the same line and the member name "Totsuka" of the multi dimensional database M2 are obtained, and they are written in the search source member data structure (14001) together with the branch of the dimension where the member obtained in the process 1305 exists (14001) and stored in the memory (1402, 1403). Similarly, the time of M1 and the time of M2 have the same member management table, so the member management table name "date code", the member management table column number "1" of the time of M1, and the member management table number "2" of the time of M2 are obtained, and the time member name "99'1" of M2 is obtained. At the time point when the dimension name of another multi dimensional database having the same member management table had been searched on all the dimension of the multi dimensional database M1 (1404), the relational data obtaining process program obtains the corresponding dimension name in the multi dimensional database M2, the branch "Totsuka", and the time "99'1" as the corresponding member name.

Next, the relational data obtaining process program accesses to the multi dimensional database M2, indicates "Totsuka" for the branch, "99'1" for the time, and the uppermost layer for the employee because of no indication (1405), and indicates the member "sale" of the measure dimension "employee total" (1406). Slicing process is executed with the indicated member (1407), and the result is sent to the application (1408). An exemplary display of the result displayed by means of the application is shown in FIG. 18. In FIG. 18, AX X X X is a code for indicating an employee. It is possible for the application by requesting to realize the transfer from the screen shown in FIG. 18 to the screen shown in FIG. 16, and the search of a new relational data from FIG. 16 and FIG. 18.

It is possible for the user to search the relational data in the multi dimensional database M2 from the certain data found during the search of the multi dimensional database M1 with only one action on the application by applying this process.

In order to show an example in which three or more multi dimensional databases are used in the multi dimensional database management system, an example in which the multi dimensional database M3 is added to the multi dimensional database management system of the above embodiment is shown. The multi dimensional database M3 comprises the product, the area, the age, the measure dimension "customer product sale total", and the measure member "sale", and stores the customer address data and the age product sale result data. The process used in the present example is the same process as used in the example in which the above-mentioned multi dimensional databases M1 and M2 are used. The process flow of each table producing process shown in FIG. 9 and FIG. 10, the process flow of the relational data item obtaining process program shown in FIG. 11 and FIG. 12, and the process flow of the relational data obtaining process shown in FIG. 13 and FIG. 14 are applied to the embodiment similarly.

The data is loaded from the slip table 1501 and the customer table 1502 shown in FIG. 15 in addition to the product table of the relational database shown in FIG. 3 to the multi dimensional database M3, and the multi dimensional database M3 is thereby constructed. At first, each table producing process reads the primary key name of each dimension of M3, the primary key, and the member from the relational database table when the multi dimensional database M3 is produced as in the case of the above embodiment. Since the member management table corresponding to the primary key name "product code" of the product has been already made, each table producing process program writes the member of the product of the multi dimensional database M3 on the column of column number "2" of the member management table "product code" by applying the same process as used in the above embodiment. Since there is no primary key for the member having the primary key corresponding to the member of the area, each table producing process program produces a new member management table "area code" 1504 for the member of the area, and writes the member of the area by applying the same process as used in the above embodiment. Since there is no primary key for the member having the primary key corresponding the member of the age, each table producing process program produces a new member management table "age code" 1505 for the member of the age, and writes the member of the age.

Next, each table producing process program writes the multi dimensional database name M3, each dimension name, the member management table on which the member of each dimension is written, and the column number on which the member in the table is stored on the dimension information management table 1506 by applying the same process as used in the above embodiment. Furthermore, each table producing process program writes the multi dimensional database name "M3", the measure dimension name "customer product sale total", and the measure member "sale" on the multi dimensional database information table 1507.

It is assumed that the user holds the search right of M3 in addition to the search right of the multi dimensional databases M1 and M2. The user requests the data that relates to the data in M3 during the search of the multi dimensional database M3 on the application. At that time, as in the case of the above embodiment in which the multi dimensional databases M1 and M2 are used, a relational data item obtaining request is issued from the application to the relational data item obtaining process program. Similarly, in the present example, the relational item obtaining program finds from the dimension information management table 1506 that the member of the product of the multi dimensional database M3 and the member of the product of the multi dimensional database M1 are written in the same member management table by applying the same process as used in the above embodiment to obtain the relational data item, obtains the measure dimension name "product sale total" of the multi dimensional database M1, the measure member "sale", and "number of sale" from the multi dimensional database information table 1507, and sends them to the application together with the multi dimensional database name M1. By applying this process, the user can obtain any data from among the measure member "sale" and "number of sale" of the measure dimension "product sale total" of the multi dimensional database M1 on the application as the relational data. In the present example, the user is interested in the sale of the product: refrigerator, the sale in the area: Totsuka-ku, Yokohama-shi, and the sale to customers of 20 to 24 years old during the searching of the multi dimensional database and wants to know other data. At that time, the user requests the data of the sale of the product sale total in the multi dimensional database M1 on the application as the relational data.

In the relational data obtaining process, a relational data obtaining request is received from the application, and the same process (FIG. 13 and FIG. 14) as used for obtaining the relational data in the above embodiment is executed. The relational data obtaining process program obtains the member of each dimension, namely "refrigerator", "Totsuka-ku, Yokohama-shi", and "20 to 24 years old", from the dictionary of the multi dimensional database M3 at first, then finds that the member of the product of the search source multi dimensional database M1 is written on the member management table "product code" on which the member of the product of M3 is written, and obtains the column number "1" on which the member of the product of M1 is written. Next, the relational data obtaining process program searches the member "refrigerator" obtained from the dictionary of M3 from the member management table "product code", and obtains the member "refrigerator" of the product of the multi dimensional database M1 on the column number 1 on the line where the member exists. The relational data obtaining process program does not obtain the member of the time and the branch of M1 of other dimension of the multi dimensional database M1 because no dimension having the same member management table as the multi dimensional database M3 exists. The relational data obtaining process program accesses the search source multi dimensional database M1 next, indicates the member "refrigerator" for the product, the uppermost layer for other dimensions, and the measure member "sale", executes slicing process, and sends the result to the application.

By applying this process, the user can obtain the relational data that exists in other multi dimensional databases from a certain multi dimensional database on the system also in the case of the multi dimensional database management system comprising three multi dimensional databases. Also, in the case of the multi dimensional database management system comprising four or more multidimensional databases, by applying the same process as used in the above embodiments, it is possible to obtain the relational data that exists in another multi dimensional database from a certain multi dimensional database. Furthermore, it is possible for the user to perform multi dimensional analysis such as drill down and drill up from the place where the relational data exists on the multi dimensional database that obtains the relational data.

The user can obtain the data on another multi dimensional database on the application without complex operation by applying the present invention. Furthermore, the user can select the search of another relational multi dimensional database on the application with one action, and it is therefore possible for the user to search the data variously without interruption of thinking during the search.

What is claimed is:

1. A method of accessing multi dimensional databases, a member management table holding a data for correlating between members of said multi dimensional databases provided for each dimension, a dimension information management table for correlating between dimensions of said multi dimensional databases and said member management table and for linking between one dimension and another dimension of said respective multi dimensional databases, and a multi dimensional database information table that holds the data items that are held in said multi dimensional databases, said method comprising the steps of:
accessing to said dimension information management table and multi dimensional database management table when an application is searching a certain multi dimensional database in response to a request that occurs for obtaining a data that is relational to certain data;
obtaining the multi dimensional database name, a measure dimension name, and a measure member where the relational data exists and for sending them to the application;
obtaining a member name corresponding to a member name of the multi dimensional database that is being searched from said member management table in response to the request of the user for obtaining the corresponding data; and
accessing to the multi dimensional database in which said relational data exists to obtain the data from said corresponding member.

2. A multi dimensional database searching method according to claim 1,
wherein said dimension information management table has the multi dimensional database name column, the dimension name column, and the member management table name column to obtain another multi dimensional database name having the same member management table name as that of the multi dimensional database that is being searched, and
wherein said multi dimensional database information table has the multi dimensional database name column, the measure dimension name column, and the measure member name column to obtain the measure dimension name and the measure member name having said another multi dimensional database name obtained by searching said multi dimensional database information table.

3. A multi dimensional database searching method according to claim 1,
wherein said member management table has a primary key and a plurality of member name columns on which member names of different multi dimensional databases are to be written,
and wherein said dimension information management table has the column that shows the member management table column name to obtain the member name corresponding to the member name of the multi dimensional database that is being searched.

4. A method of accessing multi dimensional databases, a member management table holding a data for correlating between members of said multi dimensional databases provided for each dimension, a dimension information management table having said member management table name for correlating between dimensions of the multi dimensional databases and said member management table and for linking between one dimension and another dimension of the respective multi dimensional databases, and a multi dimensional database information table that holds data items that are held in said multi dimensional databases, and when a certain multi dimensional database is being searched, in response to a request that occurs for obtaining data that relates to a certain data, said multi dimensional database searching method comprising the steps of:
a first step for searching said dimension information management table and for searching the member management table name that is common to the dimension name of the multi dimensional database that is being searched to obtain the multi dimensional database name having the same dimension name; and
a second step for searching said multi dimensional database information table to obtain the measure dimension name and the measure member name of said obtained multi dimensional database.

5. A multi dimensional database searching method according to claim 4, further comprising the steps of:
a third step for displaying the obtained multi dimensional database name, the measure dimension name, and the measure member name; and
a fourth step for obtaining the data in response to the indication for searching and obtaining the displayed result data.

6. A multi dimensional database searching method according to claim 5, wherein said fourth step further comprises:
a fifth step for obtaining the member name of each dimension of the search source;
a sixth step for obtaining the corresponding dimension name having the same member management table name from said dimension information management table;
a seventh step for accessing the member management table to obtain the corresponding member name; and
an eighth step for accessing said obtained search source multi dimensional database to obtain the data having said corresponding member name.

7. A method of accessing multi dimensional databases, said multi dimensional database searching method comprising the steps of:
producing a member management table having a plurality of multi dimensional databases from a selected table of a relational database that holds data for correlating between members of the multi dimensional database having a plurality of multi dimensional databases provided for each dimension, a dimension information management table for correlating between dimensions of the multi dimensional databases and said member management table and for linking between one dimension and another dimension of the respective multi dimensional databases, and a multi dimensional database information table that holds the data items that are held in said multi dimensional databases;

accessing to said dimension information management table and multi dimensional database management table when an application is searching a certain multi dimensional database in response to a request that occurs for obtaining data that is relational to certain data;

obtaining the multi dimensional database name, the measure dimension name, and the measure dimension where the relational data exists to send them to the application;

obtaining the member name corresponding to the member name of the multi dimensional database that is being searched from said member management table in response to the request of the user for obtaining the corresponding data; and accessing to the multi dimensional database in which said relational data exists to obtain the data from said corresponding member.

8. A system of accessing multi dimensional databases and a database searching apparatus, comprising:

a means for producing a member management table having a plurality of multi dimensional databases from a selected table of a relational database that holds data for correlating between members of the multi dimensional database having a plurality of multi dimensional databases provided for each dimension, a dimension information management table for correlating between the dimensions of the multi dimensional databases and said member management table and for linking between one dimension and another dimension of the respective multi dimensional databases, and a multi dimensional database information table that holds data items that are held in the multi dimensional databases;

a means for accessing to said dimension information management table and multi dimensional database management table when an application is searching a certain multi dimensional database in response to a request that occurs for obtaining the data that is relational to the certain data, for obtaining the multi dimensional database name, the measure dimension name, and the measure dimension where the relational data exists, and for sending them to the application; and a means for obtaining the member name corresponding to the member name of the multi dimensional database that is being searched from said member management table in response to the request of the user for obtaining the corresponding data, for accessing to the multi dimensional database in which said relational data exists, and for obtaining the data from said corresponding member.

9. A computer-readable recording medium storing a recorded program to be executed by a computer, comprising the steps of:

producing a member management table that holds the data for correlating between members of the multi dimensional database having a plurality of multi dimensional databases provided for each dimension, a dimension information management table for correlating between dimensions of the plural multi dimensional databases and said member management table and for linking between one dimension and another dimension of the respective multi dimensional databases, and a multi dimensional database information table that holds the data items that are held in said multi dimensional databases;

accessing to said dimension information management table and multi dimensional database information table when an application is searching a certain multi dimensional database in response to a request that occurs for obtaining data that is relational to certain data, for obtaining the multi dimensional database name, the measure dimension name, and the measure member where the relational data exists, and for sending them to the application; and obtaining the member name corresponding to the member name of the multi dimensional database that is being searched from said member management table in response to request of the user for obtaining the corresponding data, for accessing to the multi dimensional database in which said relational data exists, and for obtaining the data from said corresponding member.

10. A method of accessing a multi dimensional database that has a plurality of dimensions having a plurality of members, measure members which are values specified by said members of said dimensions, and measure dimension names, said method comprising the steps of:

searching a name of a common member management table corresponding to the dimensional name of the multi dimensional database under a search in order to obtain a name of a multi dimensional database having the same dimensional name;

storing a correlation of essentially the same members for members of said multi dimensional databases;

displaying a member of each dimension of a multi dimensional database searched in response to a search request and measure member specified by said member; and displaying a member of each dimension of said correlated multi dimensional database and a measure member specified by the member when displayed member is selected.

11. A method according to claim 10, wherein the method further comprises the step of:

displaying said measure dimension name and said measure member name in response to said correlated multi dimensional database when displayed member is selected.

12. A system of accessing multi dimensional databases comprising:

means for searching a name of a common member management table corresponding to the dimensional name of the multi dimensional databases under a search in order to obtain a name of a multi dimensional database having the same dimensional name;

the multi dimensional databases having a plurality of dimensions having a plurality of members, measure members which are values specified by said members of said dimensions, and measure dimension names, means for storing a correlation of essentially the same members for members of said multi dimensional databases;

means for displaying a member of each dimension of a multi dimensional database searched in response to a search request and measure member specified by said member; and means for displaying a member of each dimension of said correlated multi dimensional database and a measure member specified by the member when the displayed member is selected.

13. A system according to claim 2, wherein the system further comprises means for displaying said measure dimension name and said measure member name in response to said correlated multi dimensional database when displayed member is selected.

* * * * *